United States Patent [19]

Head et al.

[11] 3,894,646

[45] July 15, 1975

[54] REAR DOOR POWER CONVEYOR

[75] Inventors: Glenn Dale Head, Des Moines; William Robert Wood, Ankeny; John Richard Myers, Polk City, all of Iowa

[73] Assignee: Deere & Company, Moline, Ill.

[22] Filed: Aug. 23, 1974

[21] Appl. No.: 500,084

[52] U.S. Cl. ............... 214/522; 214/83.26; 198/99
[51] Int. Cl. ............................................. B60p 1/38
[58] Field of Search .......... 214/522, 521, 83.26, 85, 214/85.1; 198/94, 96, 99, 101, 97, 93, 102

[56] References Cited
UNITED STATES PATENTS

| | | | |
|---|---|---|---|
| 1,415,034 | 5/1922 | Hoelscher | 214/522 |
| 3,115,975 | 12/1963 | Thompson | 198/96 X |

*Primary Examiner*—Albert J. Makay

[57] ABSTRACT

An agricultural stack-forming implement of the type having a mobile frame, a crop-receiving container on the frame, including a rear opening and door, a power-driven floor conveyor in the crop container for moving crop material rearwardly through the rear opening, a conveyor on the rear door for moving crop material rearwardly from the crop container through the rear opening when the rear door is moved out of closing relationship with the crop container, and an engaging mechanism for drivingly engaging the rear door conveyor with the floor conveyor in response to movement of the rear door out of closing relationship with the crop container.

9 Claims, 4 Drawing Figures

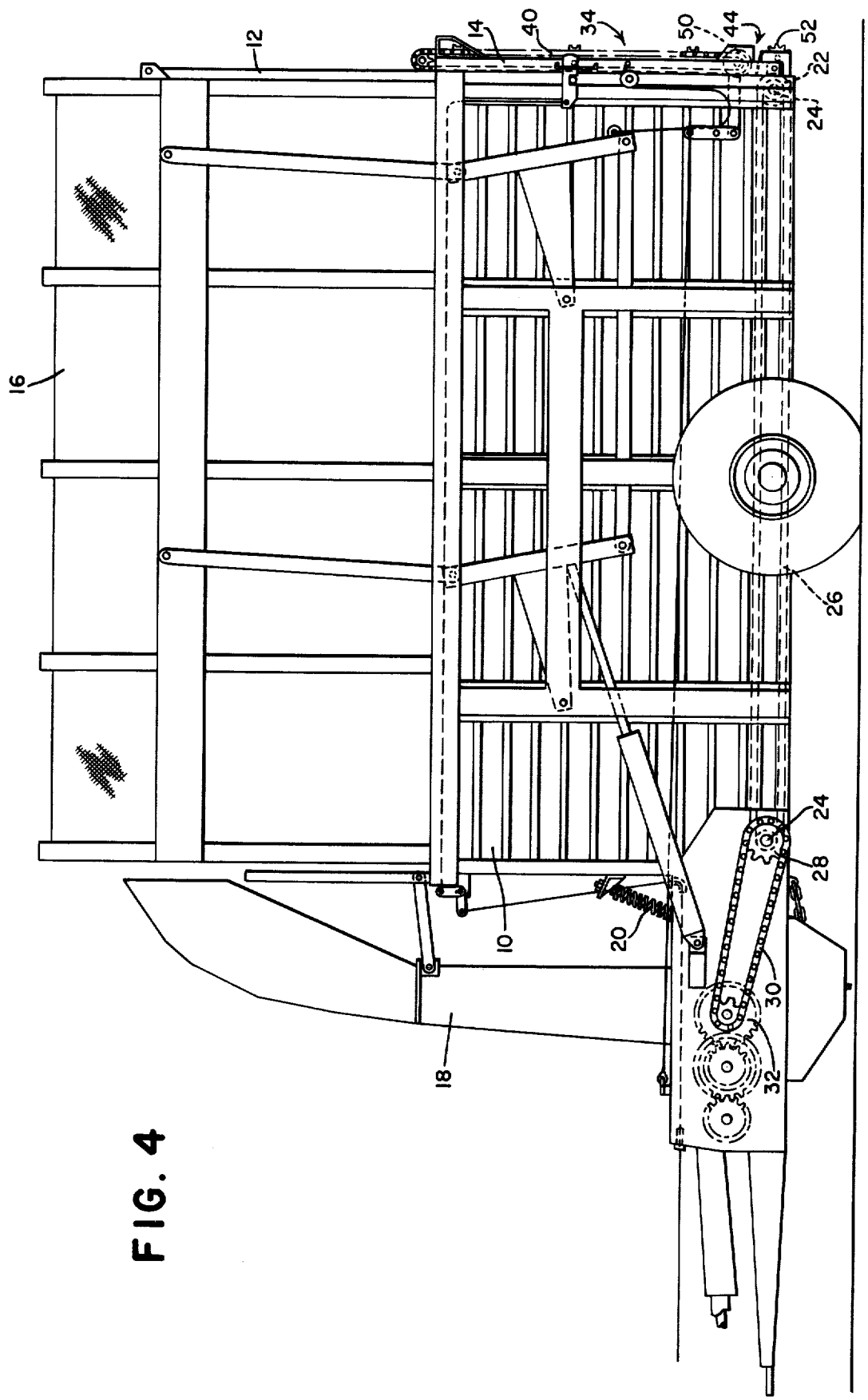

REAR DOOR POWER CONVEYOR

BACKGROUND OF THE INVENTION

The present invention relates generally to mobile agricultural stack-forming machines and more particularly to apparatus for automatically drivingly engaging the rear door discharge conveyor on such an implement with the floor conveyor, in response to movement of the door on the container out of closing relationship with the crop outlet opening.

Agricultural stack-forming implements of the type having a mobile frame adapted to be pulled by a tractor, a crop-receiving container on the frame, and a pick-up unit on the frame forwardly of the container for picking crop material up off a field and directing it rearwardly into the container are old and well known in the art. The crop-receiving container on such an implement is customarily provided with a door at the rear thereof which is normally closed during the stack-forming operation and is open to permit removal of the completed stack from the container. Removal of the completed stack is effected by means of a conveyor associated with the floor of the container which conveyor becomes operative to convey the stack rearwardly through the opening when the door is moved to its opened position. During the stack-forming operation, the floor conveyor remains in a stationary condition and should be engaged only after the rear door has been opened. In applicant's currently pending application, Ser. No. 371,733; filed June 20, 1973, controls have been provided to prevent the floor conveyor from being drivingly engaged prior to the time when the door is opened. These controls automatically engage a drive to the floor conveyor in response to movement of the rear door of the container from its closed to its opened position. With these controls the conveyor will not be engaged prior to the door being opened. In operating the conveyor system, it has been found desirable to have additional conveying means associated with the door for ease of moving the stack over the lowered door while unloading the stack. Additionally, it is desirable for the door conveyor to not be engaged while the stack is being formed or damage to the gear drive system could result as the canopy section compresses the crop material.

SUMMARY OF THE INVENTION

It is accordingly a primary object of the present invention to provide a conveyor engaging means on a stack-forming implement which will automatically engage the floor conveyor with the rear door conveyor in response to movement of the rear door of the container from its closed to its opened position. More particularly, it is an object to provide such a mechanism that is simple and reliable in operation, as well as economical to manufacture.

It is also an object to provide a rear door conveyor system that is disengaged during the stack-forming cycle. As the conveyor will then be able to move, its gear drives will not be damaged during the stack compression cycles.

In pursuance of these and other objects, the invention is embodied on an agricultural stack-forming implement of the type with a mobile frame adapted to be towed by a tractor and having a crop container mounted on the frame, and a crop pick-up and delivery unit mounted on the frame forwardly of the container for picking crop material up off a field and delivering the same rearwardly into the container. The container is provided with an opening in its rear side which is closed during the stack-forming operation by a door which is swingable to a lowered opened position to permit rearward removal of the stack from the container through the opening and over the door. The stack is removed from the container by means of conveyors associated with the floor and the door. The implement further includes a drive train on its forward end for driving the crop pick-up, delivery unit, and floor conveyor unit from a power take-off shaft on the tractor used for towing the implement.

According to the invention, a lower rear door conveyor system and control mechanism therefor is provided for drivingly connecting the rear door conveyor to the floor conveyor, which floor conveyor is drivingly connected to the pick-up unit drive train in response to movement of the rear door on the container from its closed to its opened position. This control mechanism includes a first rotary drive element coupled with and driven by the floor conveyor, a second rotary drive element coupled with a rear door crop conveyor and a third rotary drive element driven by the first rotary drive element. When the rear door is lowered, the rear door crop conveyor rotary drive element rotates into engagement with the third rotary drive element and drivingly powers the rear door stack conveyor mechanism.

BRIEF DESCRIPTION OF THE DRAWINGS

FIG. 4 is a side elevational view of the stack-forming implement with the drive cover removed to clearly illustrate the floor conveyor power train details.

DESCRIPTION OF THE PREFERRED EMBODIMENT

Figure 1:
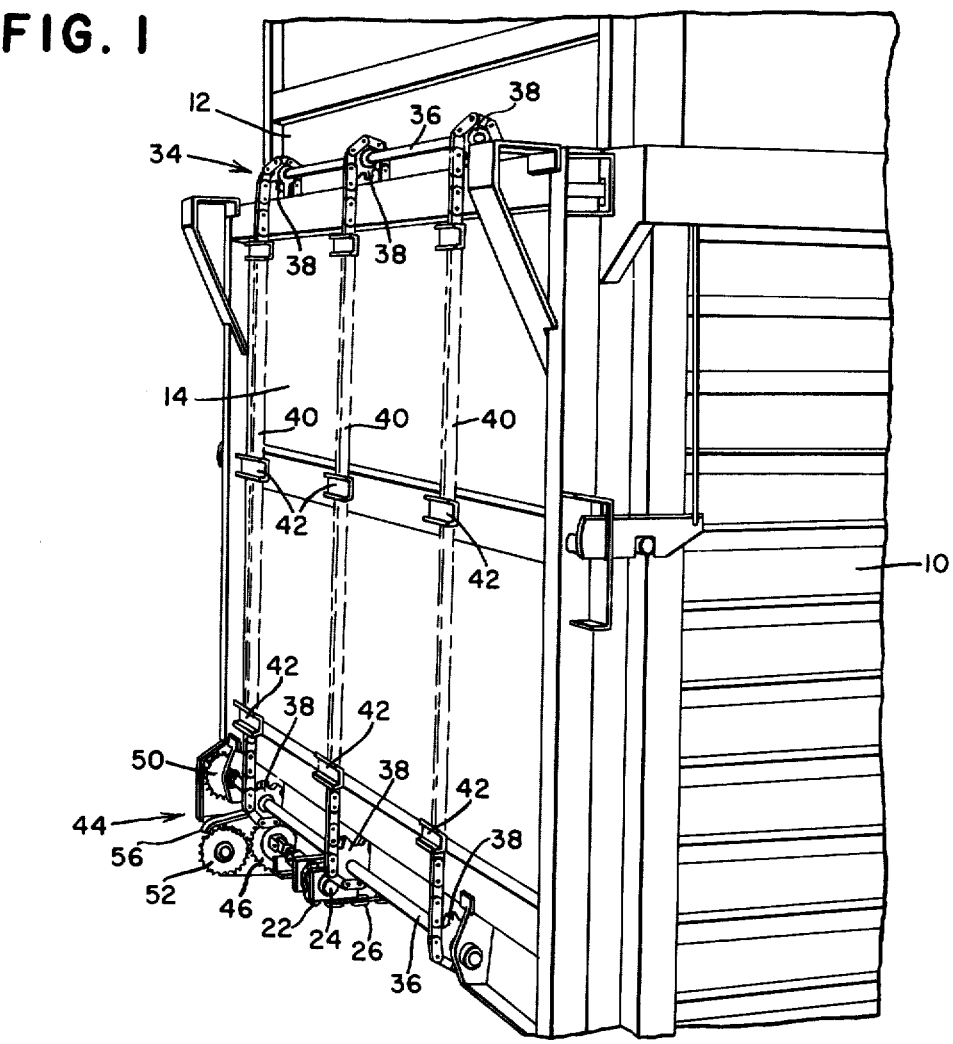
FIG. 1 is a rear side perspective view of the stack-forming implement illustrating the rear door discharge conveyor and the discharge conveyor engaging means.

The stack-forming implement embodying the invention comprises, generally, a mobile frame adapted to be towed by a tractor, a crop-receiving container carried by the frame and including a rear opening, a container top, mounted for vertical reciprocal movement and operative to compress material in the container, a crop pick-up and delivery unit mounted on the frame forwardly of the container, a driven floor conveyor in the container for moving crop material rearwardly through the rear opening, and a crop conveyor mounted on the lower rear door, said door conveyor being drivingly connected with the floor conveyor when the rear door moves out of closing relationship with the container.

Referring now to the drawings, the invention is embodied on a stack-forming implement including a crop-receiving container 10 with upper and lower rear doors designated respectively 12 and 14. The container top 16 has an inverted U-shaped configuration. A mechanism connecting the top 16 to the container and operative to move the top relative to the container between its raised and lowered positions is provided on each side of the implement. During the stack-forming process, the top 16 is normally maintained in its raised position, but from time to time the top is lowered to engage and compress the crop material that has accumulated in the container and thereby produce a more dense stack. The crop pick-up and delivery unit 18 is suspended on the frame by a pair of springs 20 which permit the unit to "float" vertically relative to the frame to conform to variations in the surface of the ground.

Associated with the floor of the crop container is a conveyor mechanism which is operative to move a compressed stack of crop material rearwardly from the container through the opening in the rear thereof and down the ramp formed by the opened lower door 14. The floor conveyor is comprised of sprockets 22 on shafts 24, chains 26 drivingly trained around the sprockets 22, the upper runs of the chains 26 passing above and the lower runs passing below the floor, and transversely extending slats interconnecting the chains 26 at longitudinally spaced intervals. In operation, the shafts 24 and chains 26 move in a clockwise direction, as viewed in FIG. 4, so that the crop-engaging slats move rearwardly along the upper surface of the floor. Power is supplied to a sprocket 28 on the extreme left end of the forward shaft 24 to drive the floor conveyor mechanism.

A clutch operates to engage the floor conveyor drive chain 30 with the pick-up unit drive when the lower rear door 14 is moved from its closed to its opened position. The floor conveyor is disengaged when the door 14 moves from its opened to its closed position.

The lower rear door 14 is pivotally connected at its lower edge to the container for pivotal movement between a raised or closed position and a lowered or opened position. In the opened position, the door rearwardly end rests on the ground and the door 14 acts as a ramp for unloading the completed stack from the container. The door 14 is shown in its opened and closed positions in FIG. 3 of the drawings.

Associated with the lower rear door is a conveyor mechanism 34, which is operative to aid the container floor conveyor in moving the completed stack of crop material rearwardly from the container through the opening in the rear thereof and down the ramp formed by the lowered rear door 14. As viewed in FIG. 1, the rear door conveyor mechanism is comprised of transversely positioned drive shafts 36 secured to the upper and lower edges of the lower door 14, with spaced-apart sprockets 38 secured to each shaft. Trained around a sprocket on each shaft 36 are endless flexible chains 40 with the runs passing both on the forward and rearward side of the door. Transversely extending slats 42 are attached to the chains 40 at longitudinally spaced intervals to engage the stacked crop material and convey it rearwardly.

Figure 2:
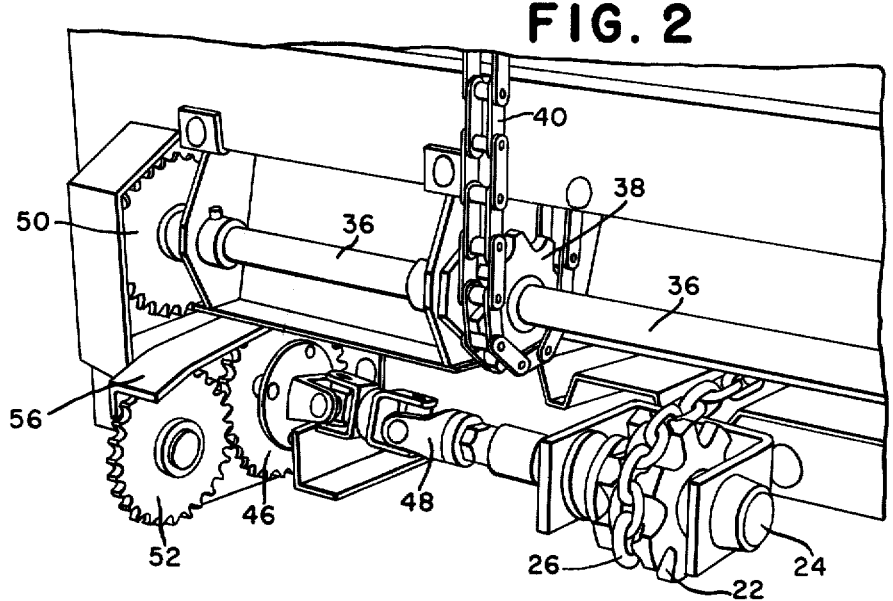
FIG. 2 is an enlarged fragmentary detailed elevational view similar to FIG. 1 with the conveyor engaging means illustrated for clarity.
Figure 3:
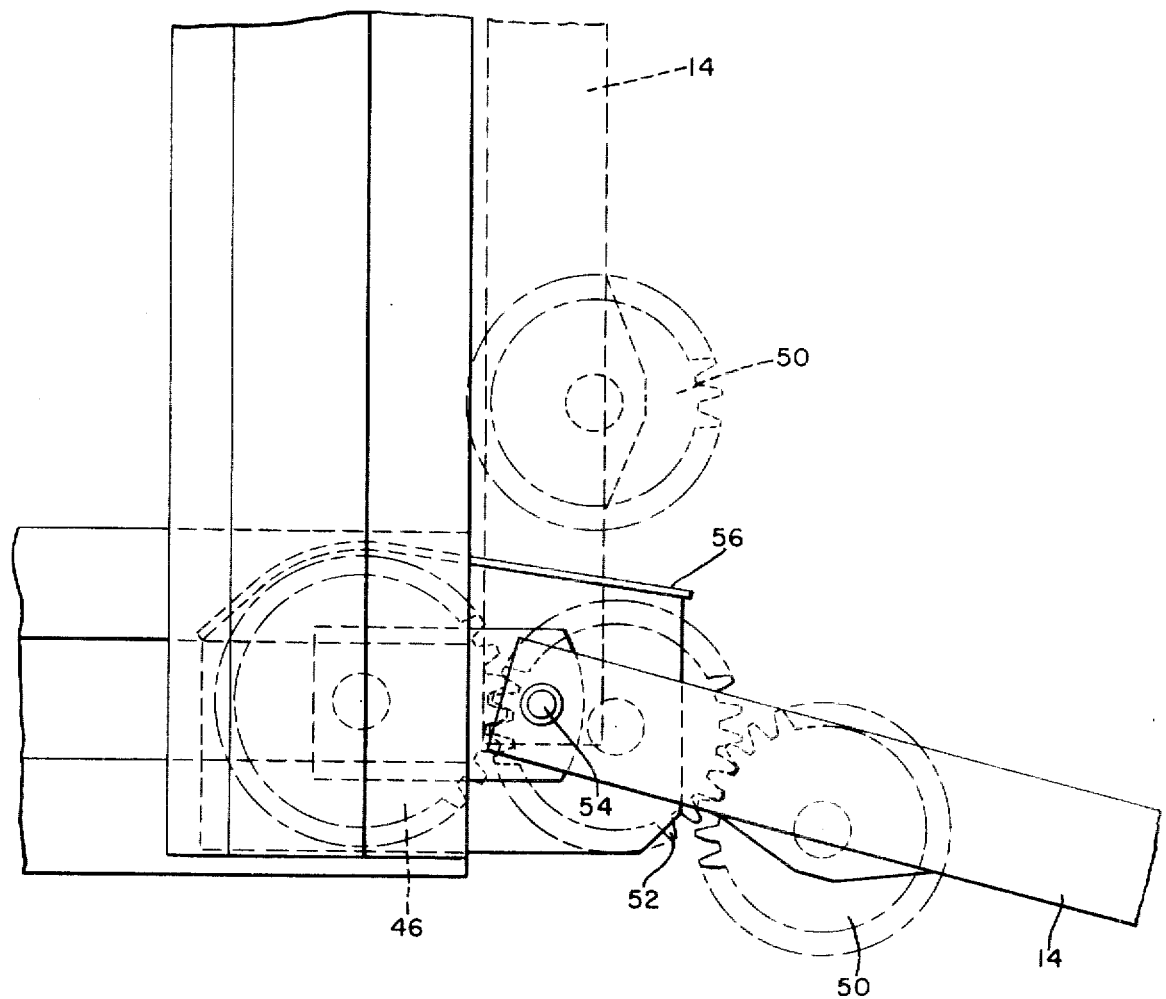
FIG. 3 is an enlarged side view illustrating the relative positions of the rotary gears when the rear door is in the lowered position or closed position.

The rear door conveyor drive mechanism, designated 44 generally on FIG. 1, which engages the lower rear door conveyor system with the floor conveyor, is comprised of a first rotary drive gear 46, rotatably secured to a U-joint shaft 48 which is coupled with a floor conveyor chain sprocket 22, a second rotary drive gear 50 secured to the rear door conveyor lower drive shaft 36, and a third rotary drive gear 52, rotatably secured rearwardly of the first gear 46 and engaged therewith. As can be seen from FIG. 2, the rotary gears are aligned to permit the floor conveyor to drivingly power the rear door conveyor 34 when the rear door 14 is lowered and the gears 50 and 52 are engaged. As can be seen in FIG. 3, the pivotal axis 54 of the lower rear door 14 is located such that the second rotary drive gear 50 does not engage the third drive gear 52 until the lower rear door 14 has opened to a generally horizontal position. Accordingly, the rear door chain conveyor is not engaged, but is free-wheeling when the stacker is operating, and the door 14 is closed. As the compressor top moves the crop material downwardly during the compression stroke, the rear door conveyor mechanism will thereby freely move and not be damaged.

In operation the lower rear door 14 is closed, as is the upper rear door 12, and the rear door conveyor rotary drive element 50 is maintained in a disengaged position. As the door is opened, the rear door conveyor rotary drive gear 50 will engage the rotary drive gear 52 which is engaged with the floor conveyor rotary gear 46. The floor conveyor chains 26 move in a clockwise direction as viewed in FIG. 4, thereby driving the sprocket 22 which in turn drives the offset U-joint shaft 48 and the floor conveyor rotary drive gear 46. The third rotary drive gear 52, driven by the first drive gear 46, in turn drives the second drive gear 50 which has with the opening of the lower rear door 14, rotated into a position of engagement with the third rotary drive gear 52. As the second drive gear 50 is drivingly rotated, the rear door conveyor shaft 36, sprockets 38, chains 40, and slats 42 accordingly move to aid the floor conveyor in moving the compressed stack rearwardly out of the stacker and onto the ground.

After the compressed stack is unloaded, the rear doors are returned to their closing relationship with the crop-receiving body and the gear 50 is disengagedly rotated upwardly. The guard 56 serves to protect the gear teeth and prevent injuries during operation of the stacker.

We claim:

1. In a crop harvesting machine comprising: a mobile frame; a crop container carried by the mobile frame and including a rear opening; at least one rear door to the crop container for movement into and out of closing relationship with the crop container; a power-driven floor conveyor in the crop container for moving crop material rearwardly through the rear opening; a conveyor mounted on the rear door for moving crop material rearwardly from the crop container through the rear opening when the rear door is moved out of closing relationship with the crop container; and a crop discharge conveyor engaging means for engaging the floor conveyor with the rear door conveyor whereby the rear door conveyor is operated by the power driven floor conveyor in response to movement of the rear door out of closing relationship with the crop container.

2. The invention defined in claim 1 in which the rear door conveyor is comprised of transverse conveyor shafts affixed to upper and lower edges of the rear door, said shafts having horizontally spaced-apart rotary drive elements mounted thereon with endless flexible elements operatively engaged to a rotary drive element on each transverse shaft.

3. The invention defined in claim 1 wherein the crop discharge conveyor engaging means which operatively engages the rear door conveyor with the floor conveyor is comprised of a mechanical coupling drivingly connected to the floor conveyor; a first rotary element secured to said coupling; a transverse shaft drivingly connected to the reear door conveyor; a second rotary element mounted on sid shaft; and a third rotary drive element axially parallel to and rotatably secured rearwardly of the first rotary drive element, engageable therewith for drivingly engaging the second rotary drive element when the floor conveyor is drivingly powered and the rear door is moved out of closing relationship with the crop container.

4. The invention defined in claim 3 in which the rear door pivot is positioned forwardly of the third rotary drive element axis of rotation so that when the rear door is moved out of closing relationship with the crop conveyor, the second rotary drive gear engages said third rotary drive gear at any one of a range of positions within a pre-determined arc.

5. The invention defined in claim 3 in which the pivotal axis of the rear door is positioned upwardly and forwardly of the third rotary drive element's rotational axis, and the rotational axis of the second rotary drive element is located relative to the rear door so that said second rotary drive element will fully engage said third rotary drive element when the rear door has opened to a generally horizontal position.

6. In a crop harvesting machine comprising: a mobile frame; a crop container carried by the mobile frame and including a rear opening; at least one rear door to the crop container for movement into and out of closing relationship with the crop container; a power-driven floor conveyor in the crop container for moving crop material rearwardly through the rear opening; a conveyor mounted on the rear door for moving crop material rearwardly from the crop container rear opening when the rear door is moved out of closing relationship with the crop container; a crop discharge conveyor engaging means having a floor conveyor drive means for engaging the floor conveyor in response to movement of the rear door out of closing relationship with the crop container; and a rear door conveyor drive means for drivingly connecting the floor conveyor with the rear door conveyor in response to movement of the rear door out of closing relationship with the crop container.

7. A crop discharging mechanism for a box-like container having a floor with front and rear ends, front and rear upright endwalls at said ends, and transversely spaced sidewalls with one of said endwalls being at a discharge end of said container and being supported on a transverse horizontal pivot at its lower edge and an adjacent transverse edge of the floor to swing vertically between an upright closed position with respect to the container and a down discharge position, said crop discharge mechanism comprising: a chain-type floor conveyor supported on the floor for shifting material toward said discharge end, said conveyor including transverse shafts at said ends and sprockets on which the chain conveyor is trained, and including at least one driven shaft at said discharge end; a chain conveyor on the discharge endwall having transverse shafts and associated sprockets at the upper and lower edges thereof including a drive shaft thereon at said lower end; and drive means between the driven shaft on said floor and the drive shaft on said endwall and including a part thereof on the drive shaft and a part thereof on the driven shaft with said parts being engageable to automatically drive said endwall conveyor upon said endwall being moved from the up to a down position and automatically disengageable when said endwall is moved to its closed position.

8. A crop discharging mechanism for a box-like container having a floor with front and rear ends, front and rear upright endwalls, and transversely spaced sidewalls with one of said end-walls being at a discharge end of said container and being supported on a transverse horizontal pivot at its lower edge and an adjacent transverse edge of the floor to swing vertically between an upright closed position with respect to the container and a down discharge position, said crop discharge mechanism comprising: a chain-type floor conveyor supported on the floor for shifting material toward said discharge end; a drive means for said floor conveyor; a central element extending between the aforesaid endwall and the drive means for driving the floor conveyor in response to said endwall moving to its down position; a chain conveyor on the discharge endwall having transverse shafts and associated sprockets at the upper and lower edges thereof including a drive shaft thereon at said lower end; and drive means between the floor conveyor and the drive shaft on said endwall, said latter drive means being engageable, to automatically drive said chain conveyor upon said endwall being lowered to a down position and automatically disengageable when said endwall is raised to its closed position.

9. A crop discharging mechanism for a box-like container having a floor, front and rear upright endwalls, and transversely spaced sidewalls with one of said endwalls being at a discharge end of said container and being supported on a transverse horizontal pivot at its lower edge and an adjacent transverse edge of the floor to swing vertically between an upright closed position with respect to the container and a down discharge position, said crop discharge mechanism comprising: a chain-type floor conveyor supported on the floor for shifting material toward said discharge end, said conveyor including transverse shafts at said ends and sprockets on which the chain conveyor is trained, and including a driven shaft at said discharge end; a countershaft rearwardly of the driven shaft; front and rear meshing gears on the driven and countershafts respectively; a chain conveyor on the aforesaid one of said endwalls having transverse shafts and associated sprockets at the upper and lower edges thereof and including a drive shaft thereon at said lower end that is vertically offset from the counter and driven shafts; and a gear on the drive shaft on said endwall engageable with the gear on the countershaft to automatically drive said endwall chain conveyor upon said endwall being lowered to a down position and automatically disengageable when said endwall is raised to its closed position.

* * * * *